(12) United States Patent
Aoyagi

(10) Patent No.: US 8,648,817 B2
(45) Date of Patent: Feb. 11, 2014

(54) PORTABLE GAME MACHINE WITH TOUCH PANEL DISPLAY

(75) Inventor: Hidetoshi Aoyagi, Tokyo (JP)

(73) Assignee: Square Enix Co., Ltd., Tokyo (JP)

( * ) Notice: Subject to any disclaimer, the term of this patent is extended or adjusted under 35 U.S.C. 154(b) by 375 days.

(21) Appl. No.: 12/727,293

(22) Filed: Mar. 19, 2010

(65) Prior Publication Data

US 2010/0238131 A1 Sep. 23, 2010

(30) Foreign Application Priority Data

Mar. 23, 2009 (JP) ................................ 2009-069999

(51) Int. Cl.
*G06F 3/041* (2006.01)
(52) U.S. Cl.
USPC ...................... 345/173; 178/18.01; 178/19.01
(58) Field of Classification Search
USPC ..................... 178/18.01–19.07; 345/173–178
See application file for complete search history.

(56) References Cited

U.S. PATENT DOCUMENTS

| | | |
|---|---|---|
| 2002/0191029 A1* | 12/2002 | Gillespie et al. ............. 345/810 |
| 2005/0197186 A1* | 9/2005 | Ohta ................................ 463/30 |
| 2006/0161846 A1* | 7/2006 | Van Leeuwen .............. 715/702 |
| 2006/0238498 A1* | 10/2006 | Kando et al. ................. 345/156 |

FOREIGN PATENT DOCUMENTS

| | | |
|---|---|---|
| JP | H6-051908 A1 | 2/1994 |
| JP | 2006-311966 A1 | 11/2006 |
| JP | 2008-148860 | 7/2008 |

* cited by examiner

*Primary Examiner* — Michael Pervan
(74) *Attorney, Agent, or Firm* — Duane Morris LLP

(57) ABSTRACT

A portable game machine with a display which also serves as a touch panel type input portion is comprised of means for detecting a contact between a finger of a player and a screen, means for computing a coordinate position of the finger on the screen, means for computing and determining the coordinate position where the object to be displayed on the display is displayed so as to separate a predetermined distance from the coordinate position of the finger and to create a gap between the object displayed on the display and a periphery of the finger contacted with the screen, and object display means for displaying the object at the computed and determined coordinate position on the display.

5 Claims, 4 Drawing Sheets

PORTABLE GAME MACHINE WITH TOUCH PANEL DISPLAY

CROSS REFERENCE TO RELATED APPLICATION

The present disclosure relates to subject matter contained in Japanese patent application No. 2009-69999 filed on Mar. 23, 2009, the disclosure of which is expressly incorporated herein by reference in its entirety.

TECHNICAL FIELD

This invention relates to a portable game machine with a touch panel display wherein a display screen is touch panel input means.

BACKGROUND ART

In the specification, "a portable game machine" includes a portable multifunction terminal having functions, such as a portable phone terminal, and a portable music/image reproduction terminal, through which a game can be also enjoyed, in addition to a machine dedicated for games.

The portable game machine has such a strong inclination that a touch panel type of input portion using a screen of the display is used rather than a keyboard type in order to obtain the display having the broadest display area. As a general instance of the touch panel, the touch panel disclosed in a first prior art is known.

PRIOR ART

[First prior art]: Japanese patent application publication No. 2008-148860

Problems to be Solved by Invention

In such a case, the player selects an object shown on the display, such as an icon and a command, by contacting a proper position of a screen of the display through his finger so as to input something in the portable game machine. A size of the display of the portable game machine is not so big in comparison with the size of the finger. If the player contacts the screen of the display for selection of the object shown on the display, the object that the player tries to select is hidden by his finger, and does not know what is selected. When the object is displayed at a position contacting the finger and the screen of the display, the displayed object is hidden by the finger and the player is difficult to know what is shown.

Even if the player tries to move the object to a proper position on the display, the object is below his finger, and the player does not know the correct position of the object on the display. For this reason, the player should repeat such an operation, and may lose an interest on the game thereby.

Then, the object of the invention to provide a portable game machine with a touch panel type display, wherein the selection or the display of the object is not hindered by the finger of the player even in a small display having a touch panel type input function, and it is possible to correctly move and position the object.

Means for Solving Problems

A first aspect of the invention is a portable game machine with a display which also serves as a touch panel input portion, comprising:

finger contact detecting means, for detecting a contact between a finger of a player and a screen of said display;

finger position computing means, for computing a coordinate position of said finger on said screen;

object display position computing means, for computing and determining a coordinate position where an object to be displayed on said display is displayed relatively to said computed coordinate position of said finger so as to separate a predetermined distance from said coordinate position of said finger on said display and to create a gap between said object displayed on said display and a periphery of said finger contacted with said screen; and object display means, for displaying said object at said coordinate position on said display which has been computed and determined.

A second aspect of the invention is the portable game machine with the touch panel display, wherein said finger position computing means repeatedly computes the coordinate position of said finger on said screen at constant intervals, and said object display position computing means computes and determines the coordinate position of said object to be displayed according to a change of said computed coordinate position of said finger position so as to always keep said relative positional relation to the coordinate position of said finger.

A third aspect of the invention is a portable game machine with a display which also serves as a touch panel input portion, comprising:

object selection means, for selecting and determining an object to be moved on a field that is displayed on a display based upon a contact operation with said display by a player;

finger contact detecting means, for detecting a contact between a finger of said player and a screen of said display;

finger position computing means, for repeatedly computing a coordinate position of said finger on said screen at constant intervals;

relative position computing means, for computing a relative positional relation between said computed coordinate position of said finger and said object selected by said object selection means;

display form change means, for changing a display form on said display in order to easily recognize said position of said object on said field selected by said object selection means;

object display position computing means, for computing and determining the coordinate position of said selected object to be displayed according to a change of said computed coordinate position of said finger so as to always keep said relative positional relation to the coordinate position of said finger; and object display means, for displaying said selected object at said coordinate position on said display computed and determined, changing a display form through said display form change means.

A fourth aspect of the invention is the portable game machine with the touch panel display, wherein said display form change means has object separation display means, and said object separation display means divides said object into a cursor and an object body if said finger contact detecting means detects a contact between said finger and said screen, and locates said cursor at said coordinate position where said object has been located as it is, and locates said object body at a periphery of said cursor and displays it.

A fifth aspect of the invention is the portable game machine with the touch panel display, wherein said display form change means displays said object in a semi-transparent state if said finger contact detecting means detects a contact between said finger and said screen.

Effects of Invention

According to the first aspect of the invention, at the time of display of the object, the object is displayed separating from a periphery of the finger that contacts with the screen of the display through the gap (SP), so that there is no such a situation that the player does not know what is shown due to a hindrance of the object by the finger, and it is possible to provide the portable game machine having a good visibility.

According to the second aspect of the invention, the object is displayed, always keeping a constant relative position to the finger even if the finger is slidably moved on the screen, so that it is possible to provide the portable game machine having a good visibility in connection with the object even if the finger is moved. Besides, it is possible to correctly select the other object, such as the character (CR), making use of the object, such as the cursor (CS), with no hindrance by the finger.

According to the third aspect of the invention, if the finger contacts with the display screen (3a), a display form of the selected object is changed, so that it is possible to easily recognize the position of the object on the field. Even if the position of the finger is slidably moved on the screen, the object is controlled to be moved, keeping the relative positional relation between the finger and the object. For this reason, it is possible to always keep the object at the position where the player can easily recognize the object. Therefore, it is possible to correctly move and position the object.

According to the fourth aspect of the invention, the object is displayed, separating the cursor (CS) and the object body (PC) from each other, so that the position of the cursor (CS) on the field (FLD) can be correctly recognized with no hindrance by the object body.

According to the fifth aspect of the invention, the object is displayed in a semi-transparent state, so that the field (FLD) can be recognized through the object and the position of the object on the field (FLD) can be correctly recognized.

The number in parentheses shows the corresponding element in the drawings for the sake of convenience, accordingly, the descriptions are not restricted and bound by the descriptions on the drawings. Besides, the scope of the invention is not restricted by the descriptions of the drawings. The scope of the invention is designated based upon technical ideas shown in the accompanying claims.

An embodiment of the invention is now explained, referring to appended drawings.

Figure 1:
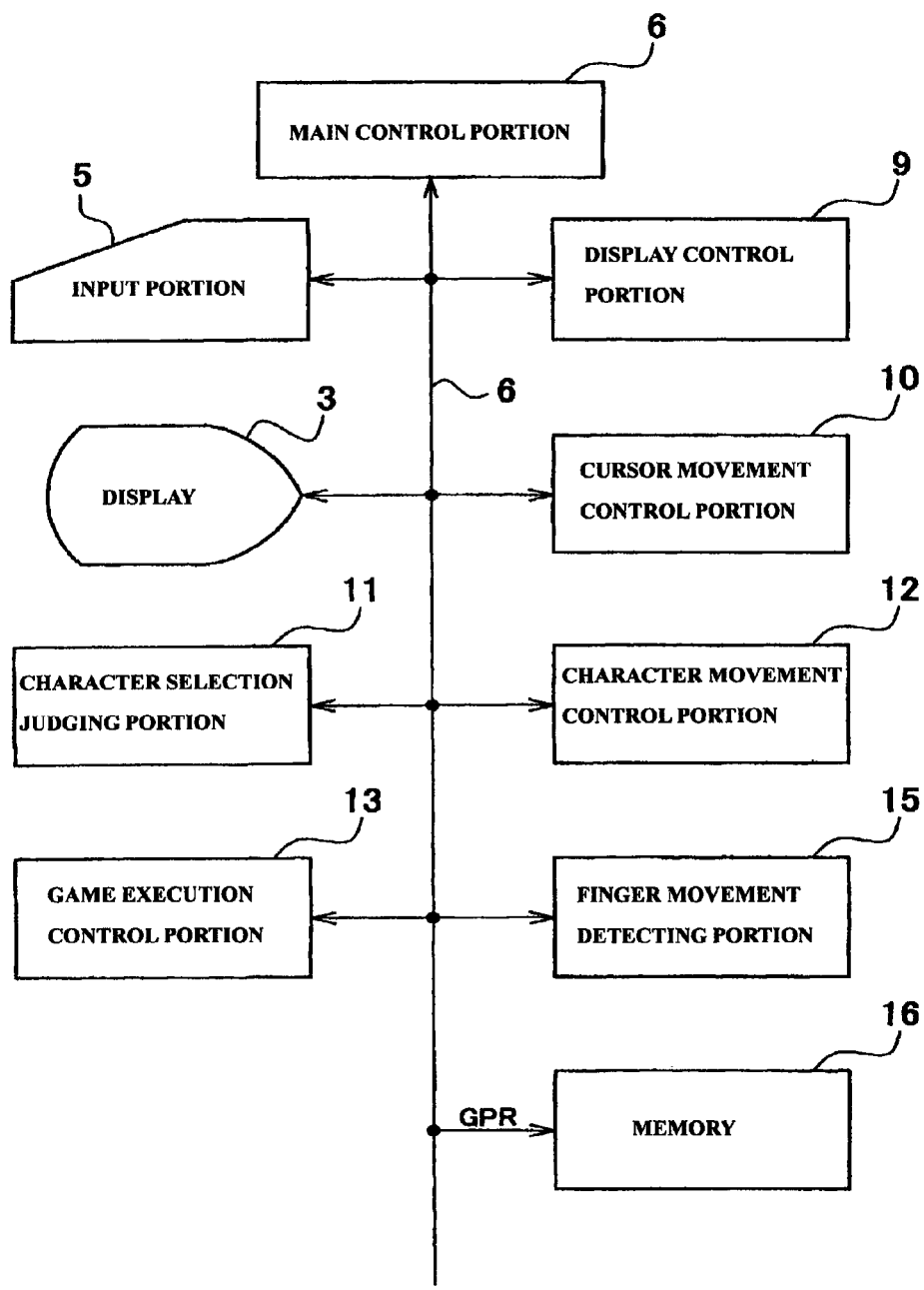
FIG. 1 is a block diagram of a portable game machine to which the invention is applied.
Figure 2:
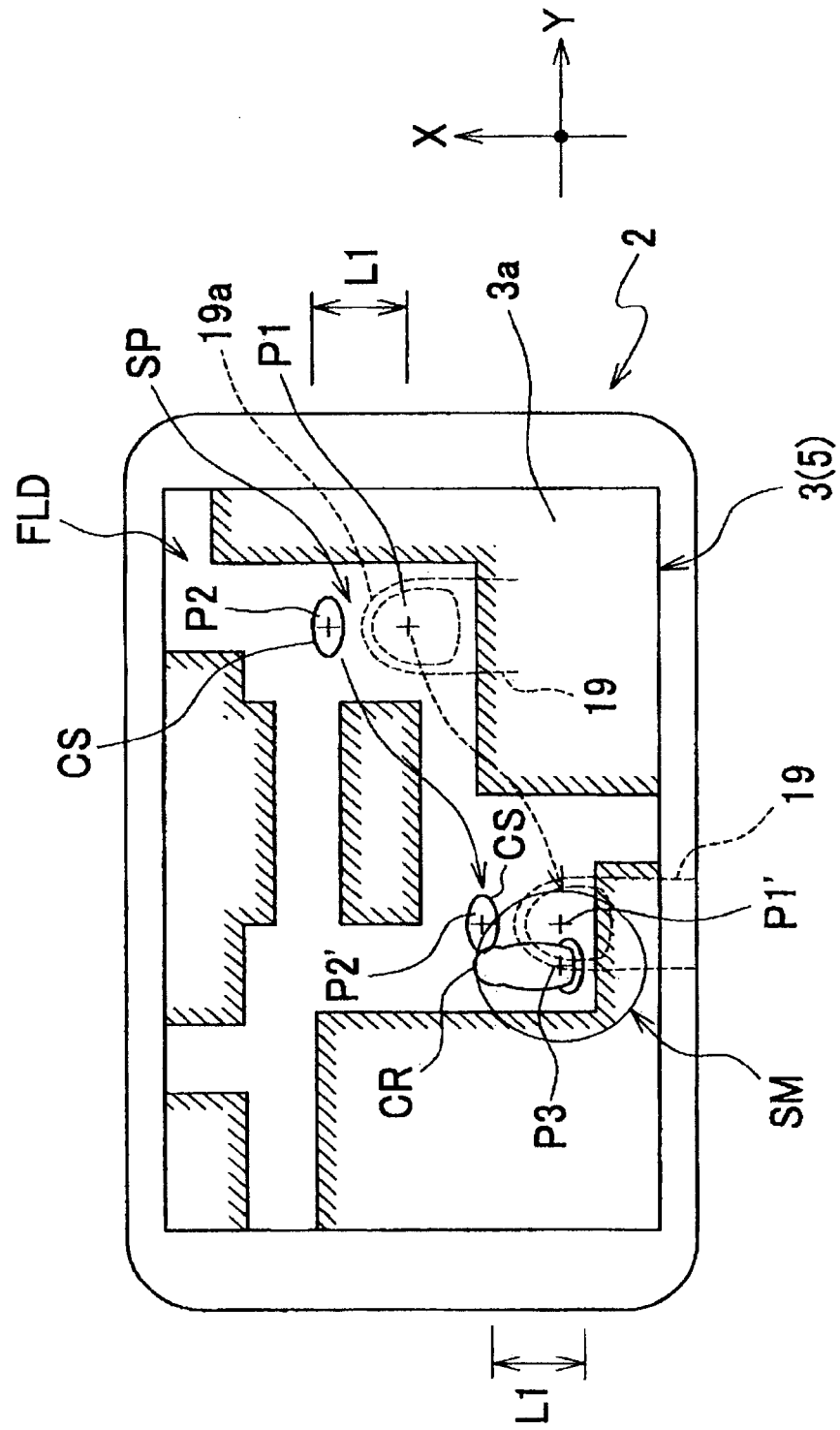
FIG. 2 is a typical view that shows an instance of a display form in a display of the portable game machine.

FIG. 1 shows a portable game machine, as a game machine comprising a computer. As shown in FIG. 2, the portable game machine 1 has a main body 2, a portable housing, and the main body 2 is provided with a display 3. The display 3 also serves as a touch panel input portion 5 also, and a player selects various kinds of objects displayed on a screen 3a of the display 3, such as a cursor, an icon and a character, by pushing the objects down with his finger in order to get the portable game machine 1 to do various kinds of processing corresponding to the objects. A method of inputting of a touch panel type is not mentioned since it is already known. In a case of the portable game machine 1, all data is inputted by touching the screen 3a of the display through a finger.

As shown in FIG. 2, the portable game machine 1 has a main control portion 6, and the main control portion 6 contacts with the touch panel inputting portion 5, a display control portion 9, the display 3, a cursor movement control portion 10, a character selection judging portion 11, a character movement control portion 12, a game execution control portion 13, a finger movement detecting portion 15 and a memory 16 through a bus line 6. All such structural elements are provided at the main body 2, and carrying of the main body 2 by a player means carrying of the portable game machine 1. The block diagram of FIG. 1 exemplarily shows only portions pertinent to the invention, and all structural elements of the actual portable game machine 1 are not shown in the figure. In this embodiment, the display control portion 9 comprises object display means, and the cursor movement control portion 10 comprises object display position computing means and object selection means in attached claims. And, the character selection judging portion 11 comprises object selection means and relative position computing means in the attached claims, and the character movement control portion comprises display form change means, object display position computing means and object separation display means in the attached claims. Furthermore, the finger movement detecting portion 15 comprises finger contact detecting means, finger position computing means and object selection means in the attached claims.

In the portable game machine 1 as shown in FIG. 2, actually, a computer executes predetermined program read out of a memory (not shown) storing the program therein, through which a CPU (not shown) or a memory time-dividedly operates by a multi-task and executes functions shown in respective blocks as shown in FIG. 1. But, the portable game machine 1 may be comprised of hardware corresponding to respective blocks, and each block may be controlled by a CPU or a MPU that is separately provided for each block.

When a player plays a game with the portable game machine 1 having the above-mentioned structure, the player instructs to start the game through operation of the touch panel input portion 5 as shown in FIG. 1. Receiving such an instruction, the main control portion 6 instructs the game execution control portion 13 to execute the game, and the game execution control portion 13 reads predetermined program GPR out of the memory 16 and execute such program.

The game according to the game program GPR includes an operation by a player of positioning the cursor CS that is comprised of an object in the attached claims at a proper position in a two-dimensional field FLD on the display, as shown in FIG. 2, for instance. This operation is generally executed in such a way that the player presses an optional position on the display 3 so that the cursor CS can appear on the screen 3a, and drags the finger as it is to a desired position on the screen 3a. A control for moving and positioning the cursor CS of the portable game machine 1 according to the invention is now mentioned.

In a case where a player selects a desired character CR from one or more characters CR displayed on the display 3 and instructs the game machine 1 to determine the selected character, the player firstly puts his finger 19 on an optional position on the screen 3a of the display 3, contacting his fingertip 19a with the screen 3a. When the fingertip 19a is located on the screen 3a, the finger movement detecting portion 15 detects a contact between the finger 19 and the screen 3a and informs the cursor movement control portion 10 of the contact and its coordinate position P1. The cursor movement control portion 10 asks the character selection judging portion 11 whether or not the player presently selects a specific character CR. In such a state, a specific character CR is not yet selected, so that the character selection judging portion 11 informs the cursor movement control portion 10 of no selection of the character CR by the player.

Receiving this notification, the cursor movement control portion 10 computes and determines a coordinate position P2 that is a predetermined distance L1 away from the fingertip 19a, on an upper hand in FIG. 2 (In this case, "the upper hand" is not necessary to be accurate +direction in X-axis direction) of the coordinate position P1 of the screen 3a of the display 3 where the fingertip 19a is presently located, and instructs the display control portion 9 to locate a semi-transparent cursor CS at the coordinate position P2. Receiving this instruction, the display control portion 9 displays the cursor CS at the coordinate position P2 on the screen 3a of the display 3, as shown in FIG. 2. The cursor CS is displayed a predetermined distance away from the fingertip 19a of the player on the upper hand (+direction in X-axis direction) on the screen 3a, so that there is no such situation that the player does not easily know the position of the cursor CS on the screen 3a since the cursor CS is displayed below his own fingertip 19a. The distance L1 is a value that is set in advance in a memory (not shown) in the cursor movement control portion 10, and is set so as to perceive the top end of the fingertip 19a located on the screen 3a and the cursor CS for the player, clearly separating both from each other (for instance, so as to create 1 cm or so of a gap SP on the screen 3a).

The above-mentioned case refers to such a case that the object, such as the cursor CS, is displayed at the position a predetermined distance away from the fingertip of the player in +direction in X-axis (upper hand of the screen 3a of the display), that is, so as to form a gap SP between the top end of the fingertip 19a of the player and an image of the object. But, the relative position of the object to the fingertip 19a is not always on upper hand of the screen 3a of the display, but may be in any direction around the fingertip 19a as long as the gap SP is formed between a periphery of the finger 19 and the object and the player can perceive the position of the object without being interrupted by the fingertip 19.

After thus displaying the cursor CS on the display 20a, the player moves his fingertip 19a on the screen 3a for a coordinate position P3 where the character CR that he wishes to select is displayed while the fingertip 3a being contacted with the screen 3a. The finger movement detecting portion 15 repeatedly computes the coordinate position P1 where the fingertip 19a contacts with the display 20a at predetermined intervals, watching a contact state between the fingertip 19a and the screen 3a, and outputs the computed to the cursor movement control portion 10 at predetermined intervals. The cursor movement control portion 10 computes and determines the display position P2 of the cursor CS based upon a change of the coordinate position P1 of the fingertip 19a outputted from the finger movement detecting portion 15 so that the cursor CS can always be the distance L1 away from the coordinate position P1 in +direction in X-axis, and instructs the display control portion 9 to display the cursor CS at the display position P2.

By doing so, the display control portion 9 always displays the cursor CS at the position P2 a predetermined distance away from the fingertip 19a of the player in the upper hand. As the player moves his fingertip 19a on the screen 3a for the coordinate position P3 where the character CR is displayed, the cursor is moved and displayed in the direction of the coordinate position P3, keeping a direction parallel to the movement direction of the fingertip 19a so as to synchronize with such a movement of the fingertip. Then, the cursor CS is moved, always being displayed on the upper hand from the top end of the fingertip 19a of the player through a gap SP, so that the player can correctly recognize the present position of the cursor CS, regardless of the movement of his fingertip 19a.

The cursor movement control portion 10 computes and determines the coordinate position P2 of the cursor CS, keeping a constant positional relation with respect to the coordinate position P1 of the present fingertip on the display, that is, maintaining the relative position on a X-Y coordinate. Therefore, even if in some setting, the cursor CS is not in +X-axis direction of the fingertip 19a (for instance, in such a setting that the cursor CS is on a side in + or −Y-axis direction of the fingertip 19a), the cursor CS is controlled to be displayed following slidable movement of the fingertip 19a on the screen 3a through the gap SP.

When the player thus moves his fingertip 19a in the direction of the character CR to be selected, in the left lower direction of FIG. 2 on the screen 3a, the cursor CS is displayed, also being moved close to the character CR in the left lower direction of FIG. 2 together with the movement of his fingertip. FIG. 2 shows only one body of the character CR for easy understanding, but one or more different characters CR are actually displayed on the display 20a. The player moves his fingertip 19a on the screen 3a, confirming the position of the cursor CS for making the cursor CS gradually close to the character CR that he wishes to select. Finally, the cursor CS is contacted with the image of the character CR displayed on the display 20a.

Then, the cursor movement control portion 10 detects a contact between some character CR displayed on the display 20a and the cursor CS, and informs the character selection judging portion 11. Receiving this notification, the character selection judging portion 11 specifies the character CR contacted with the cursor CS. Name of the character CR that is located by the game execution control portion 13 on the display 20a and its coordinate position are notified from the game execution control portion 13 to the cursor movement control portion 10 and the character selection judging portion 11. For this reason, it is possible for the cursor movement control portion 10 to easily detect the contact between the cursor CS and the character CR and for the character selection judging portion 11 to easily specify the character CR contacted with the cursor CS.

When name of the character CR contacted with the cursor CS and its coordinate position P3 are thus specified, the character selection judging portion 11 displays through the display control portion 9 on an image of the character CR, selected by contacting through the player, a circular selection mark SM which center is the semi-transparent cursor CS which is located under the image of the character CR. By such a selection mark SM, the player can recognize the selection of the character CR that is contacted with the cursor CS by his own on the screen of the display 20a. When the character CR being selected, the player removes his fingertip 19a from the screen 3a, but such a selection state is maintained and display of the selection mark SM continues. The cursor movement control portion 10 and the character movement control portion 12 is notified of the character CR that was judged to have been selected by the character selection judging portion 11.

Even if the cursor movement control portion 10 detects the contact between the cursor CS and the image of the character CR displayed on the display 20a and the selection mark SM is displayed on the image of the character CR, the selection of the character CR is not immediately determined. This is because the cursor CS may be inadvertently contacted with the image of the character CR displayed on the screen that the player does not intend to select while moving the cursor CS by the player when the images of two or more characters CR are displayed on the display 20a.

Whenever the contact between the cursor CS and the image of the character CR displayed on the display 20a is detected, the character selection judging portion 11 displays the selection mark SM for the image of the character the contact of which was detected, but, the selection of the character CR is not fixed as long as the player does not remove his fingertip 19a from the screen 3a during displaying of the selection mark SM for the character CR. In other words, the character selection judging portion 11 keeps the character CR in a provisional selection state.

In a case where the player further moves his fingertip 19a on the screen 3a without removing from the screen 3a and with such a movement, the cursor CS is away from the image of the character CR with which the cursor CS has contacted, the cursor movement control portion 10 detects a release of the contact between the cursor CS and the character CR, and informs the character selection judging portion of such a detection. Receiving such a notification, the character selection judging portion 11 releases display of the selection mark SM which has been displayed on a periphery of the character CR, and releases the provisional selection state of the character CR for changing into a pre-selection state.

A condition for fixing the selection of the character CR by the player through the character selection judging portion 11 is that the fingertip 19a of the player is removed from the screen 3a in a state the selection mark SM is displayed for the character CR. If the fingertip 19a of the player is removed from the screen 3a, the finger movement detecting portion 15 detects remove from the fingertip 19a from the screen 3a and the character selection judging portion 11 fixes the selection of the character CR on which the selection mark SM is displayed on such a point of time as the character CR selected by the player and informs the character movement control portion 12 of the character CR as the character the selection of which was fixed by the player, that is, as the character CR that is a subject for movement control by the character movement control portion 12.

Even in such a case where the cursor CS is moved for the character CR to be selected when selecting the character CR, it is possible to move the cursor CS to the position where the desired character CR is displayed, watching the cursor CS displayed on the upper hand from the top end of the fingertip 19a of the player through the gap SP, and the cursor CS can be accurately contacted with the desired character CR thereby. This is especially effective if two or more other characters CR are located in groups at a periphery of the desired character CR and it is necessary to move the cursor CS to the position where the desired character CR is displayed by moving the cursor CS on the screen 3a avoiding these characters CR.

Figure 3:
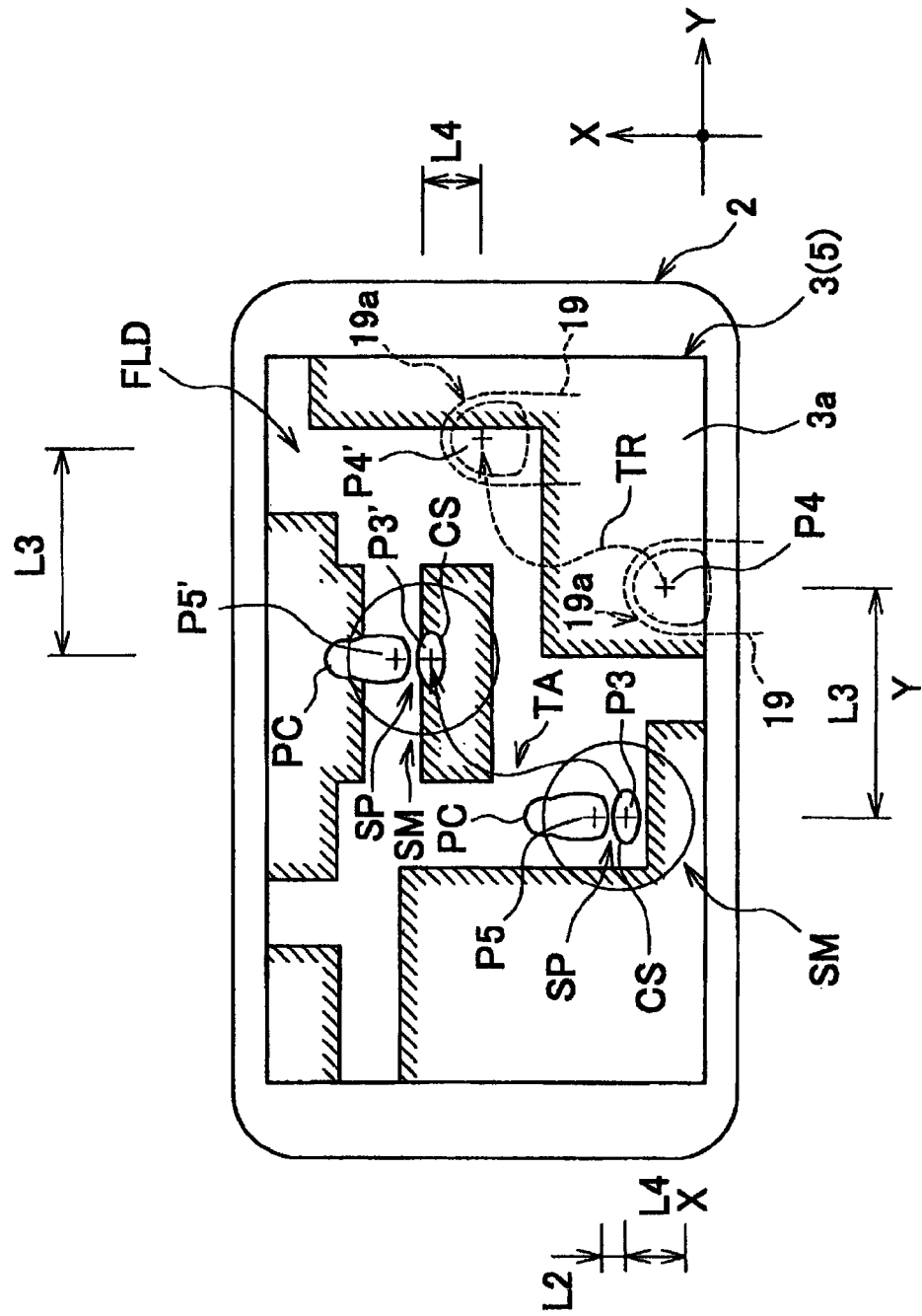
FIG. 3 is a typical view that shows another instance of the display form in the portable game machine.

When the player thus selected the character CR and moves the character selected by his own from the position P3 as shown in FIG. 3 to a position P3' on the field FLD, synchronizing with the movement of his fingertip 19a (Such a movement is referred to as "drag movement" hereinafter), the player contacts his fingertip 19a with a proper position on the screen 3a of the display 20a. On such an occasion, the player considers the position P3 where the character CR is presently displayed and the position P3' to which the character CR should be moved from now on so as to select the position where it is possible to observe both positions P3 and P3' and the field FLD between both positions P3 and P3', such as position P4 of FIG. 3, and the fingertip 19a is contacted with the position P4.

If the character CR to be moved is not already selected, that is, if the selection mark SM is not located on the character CR, the selection mark SM may be located and displayed on the image of the character CR through the display control portion 9 in such a way that the player directly touches the image of the character CR displayed on the screen 3a so as to detect the coordinate position of the touched fingertip 19a through the finger movement detecting portion 15, and the character selection judging portion 11 detects a correspondence between the detected coordinate position of the fingertip 19a and the coordinate position of the character CR displayed on the screen 3a so as to judge the selection of the character CR by the player, as another method rather than the method by moving the cursor CS so as to contact the character CR.

When the fingertip 19a of the player is contacted with the screen 3a, the finger movement detecting portion 15 detects the contact between the fingertip 19a of the player and the screen 3a. If the contact between the fingertip 19a and the screen 3a continues over a constant time, such as 0.1 second, the drag movement of the character CR is judged to be instructed, and such a judgment is informed to the character movement control portion 12. Receiving this notification, the character movement control portion 12 displays the image of the character CR by separating the semi-transparent cursor CS and the image of the character body (the object body) PC from each other for the character CR (on which the selection mark SM is shown) which was selected by the player and which selection was determined by the character selection judging portion 11, as shown in FIG. 3. In other words, the cursor CS that shows the position P3 of the selected character CR is displayed at the coordinate position P3 where the character CR is originally located as it is, and the image PC of the character body (the object body) is displayed at the coordinate position P5 on upper hand of the cursor CS, that is, predetermined distance L2 away from the cursor in the +X-axis direction so as to separate both from each other. The image PC of the character body is not always located on the upper hand of the cursor CS, but may be located at any position of the periphery of the cursor CS as long as such a position corresponds to the cursor CS.

Then, the character CR selected by the player is displayed on the field FLD through the gap SP so that the image PC of the character body rises on the cursor CS. The character CR in the selection state is displayed, separating the cursor CS that shows the position of the character CR and the image PC of the character body that shows the character CR itself from each other, so that the player can easily recognize the correct position of the character CR on the field FLD by the semi-transparent cursor CS. In such a case, in order for the player to easily recognize the correct position of the character CR on the field FLD through the cursor CS, the character CR is displayed, separating the cursor CS and the image PC of the character body from each other. For this reason, it is not always to display the character CR separating the cursor CS and the image PC of the character body as long as the player can easily recognize the position of the character CR on the field FLD. For instance, when contacting the fingertip 19a of the player on the screen 3a, the character body movement control portion 12 can increase the transparency in the display of the character CR for making it semi-transparent so as to recognize the position of the field FLD displayed beneath thereof, looking through the image of the character CR.

After thus selected character CR is displayed, separating the cursor C and the character body image PC, the fingertip 19a of the player is moved for the position P4', sliding on the screen 3a. In such a case, the finger movement detecting portion 15 always computes and detects the coordinate position of the fingertip 19a on the screen 3a, and informs the cursor movement control portion 10 and the character body movement control portion 12 of the computed result. And, the cursor movement control portion 10 computes and stores a relative positional relation of the coordinate position P3 of the character CR to the coordinate position P4 at the time when the fingertip 19a of the player firstly contacts the screen 3a as a distance on X-Y coordinate X, Y=(L4, L3). By moving the fingertip 19a on the screen 3a, the coordinate of the cursor CS to be displayed is determined such that the relative positional relation between the fingertip 19a and the character CR can always be the distance X, Y=(L4, L3), and is displayed through the display control portion 9.

On the other hand, the character movement control portion 12 computes and determines the position of the character body image PC so as to position it at a position a predetermined distance L2 in the upper hand of FIG. 3 away from the cursor CS that moves keeping a constant distance X, Y=(L4, L3) on the screen 3a and the display control portion 9 displays the computed position. By doing so, the character body image PC is displayed on the display 3 rising on the upper hand of the cursor CS through the gap SP.

If the player slidably moves his fingertip 19a for the position P4' on the screen 3a in the afore-mentioned state, the character CR is displayed such that the cursor CS of the character CR and the character body image PC moves on the field FLD, parallel to movement trace TR of the fingertip 19a, as shown in FIG. 3. And, the cursor CS is always displayed separated from the fingertip 19a of the player a predetermined distance X, Y=(L3, L3). For this reason, the character CR is displayed, separating the cursor CS that shows the present position of the character CR and the character body image PC displayed thereon (+direction in X-axis), and the position of the character CR on the field FLD that is moving can be clearly recognized by the cursor CS with no interference from the character body image PC, so that the character CR can be correctly moved and positioned at the coordinate position P3'.

When the character CR reaches the coordinate position P3', the fingertip 19a of the player is away from the screen 3a. Then, the finger movement detecting portion 15 detects separation of the fingertip 19a of the player from the screen 3a, and informs the character movement control portion 12 of such a separation. Receiving this notification, the character movement control portion 12 returns the character body image PC that has been displayed floating over the cursor CS onto the cursor CS. Then, the image of the character CR returns to the image similar to a normal image of the character CR in the position P3 of FIG. 2 where the cursor CS and the character body image PC are united with each other.

When the player touches a determination button (not shown) that is shown at a proper position on the screen 3a of the display 3, the position of the character CR located at the position P3' is fixed to be determined, and the game execution control portion 13 recognizes that the character CR was located at the coordinate position P3' which was fixed to be determined by a dragging movement and advances the game on the basis of this recognition. If the determination button is touched, the selection state of the character CR that has been in the selection state by the player is released and the character selection judging portion 11 stops displaying the selection mark SM which has enclosed the character CR.

Figure 4:
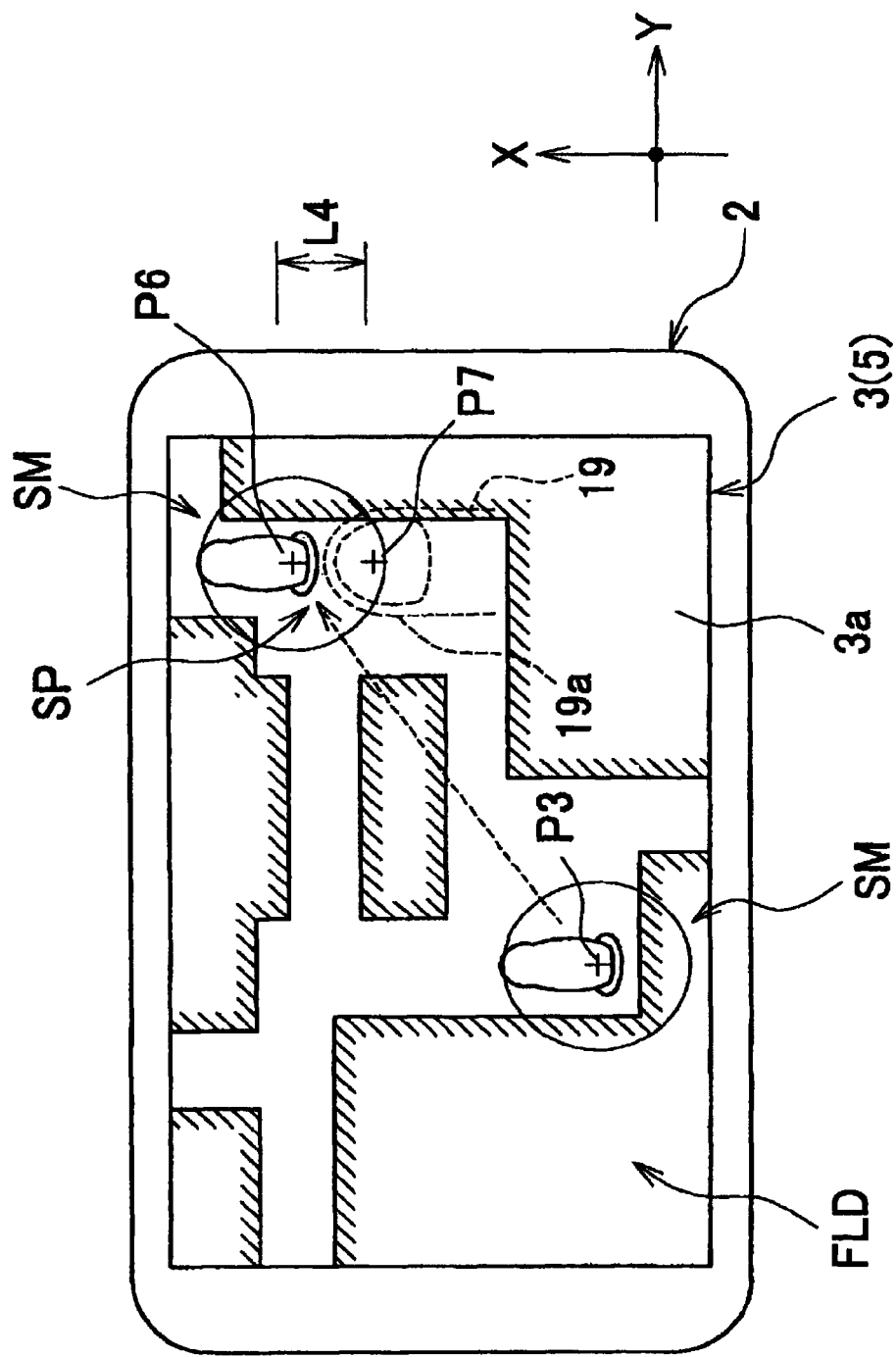
FIG. 4 is a typical view that shows another alternate instance of the display form in the portable game machine.

If the character CR that is enclosed by the selection mark SM and is in the selection state is promptly moved from the coordinate position P3 to a position near the coordinate position P6, for instance, as show in FIG. 4, the fingertip 19a of the player is momentarily contacted on the screen 3a of the coordinate position P7 rather lower than the coordinate position P6 to which the character CR should be moved. Then, the finger movement detecting portion 15 detects the contact of the fingertip 19a of the player with the screen 3a, and at the same time, judges that the contact of the fingertip 19a on the screen 3a is shorter than a predetermined time, such as 0.1 second. Then, the fingertip movement detecting portion 15 judges that a momentary movement of the character CR is instructed, and informs the character movement control portion 12 of this judgment.

Receiving this notification, the character movement control portion 12 computes and determines the display position of the object of the character CR that has been displayed at the coordinate position P3 (the cursor CS and the image PC of the character body) as the coordinate position P6 on the upper hand of the coordinate position P7 of the fingertip 19a in FIG. 4, that is, a distance L4 away in +X-axis direction, and instructs the display control portion 9 to move the character CR to such a position and display it. Receiving this instruction, the display control portion 9 moves the image of the character CR that has been displayed at the coordinate position P3 to the coordinate position P6 and displays it at such a position. In this case, the image of the character CR is momentarily moved. For this reason, the player feels no stress due to the movement of the character CR.

Besides, the image of the character CR at the time of momentary movement is displayed in +X-axis direction of the fingertip 19a of the player, that is, on the upper hand of the screen 3a through the gap SP on the field FLD, and the position of the character CR after the movement can be easily recognized with no hindrance from the position of the fingertip 19a of the player thereby.

If the player touches the determination button (not shown) which is displayed at a proper position on the screen 3a of the display 3 in the afore-mentioned state, the position of the character CR located at the position P6 is fixed to be determined, and the game execution control portion 13 understands that the character CR was located at the determined coordinate position P6 by the momentary movement and advances the game thereafter. When touching the determination button, the selection state of the character CR that has been in the selection state by the player is released, and the character selection judging portion 11 stops displaying the selection mark SM that has enclosed the character CR.

The invention claimed is:

1. A portable game machine with a display which also serves as a touch panel type input portion, comprising:
    object selection means, for selecting and determining an object that is displayed on said display at an object coordinate position when a finger of a player contacts a screen of said display at said object coordinate position, and displaying a selection mark showing a selection state on said object that was selected and determined;
    finger contact detecting means, for detecting a second contact when the finger of said player contacts said screen of said display again after said object is selected and determined through said object selection means, and judging that a movement of said selected object is instructed;
    finger position computing means, for repeatedly computing a coordinate position of said finger on said screen, during said second contact, at constant intervals;
    relative position computing means, for computing a relative positional relation between said computed coordinate position of said finger and said object coordinate position of the selected object;
    object separation display means, for separating said object into a cursor and an object body when said finger contact detecting means detects said second contact between said finger and said screen, and locating and displaying said cursor at said object coordinate position, and locating and displaying said object body at a predetermined distance away from said cursor in order to easily recognize said object coordinate position of said object on said field selected by said object selection means;

object display position computing means, for computing and determining the object coordinate position of said cursor displayed separated from said object body of said selected object to be displayed according to a change in said computed coordinate position of said finger, so as to always maintain said relative positional relation to the computed coordinate position of said finger; and object display means, for displaying said cursor separately from said object body of said selected object at said coordinate position on said display;

whereby said selected object is moved in parallel to a movement locus on said screen of said finger during said second contact and the movement of said selected object can be instructed by said player while contacting the screen at a position different from said object coordinate position.

2. The portable game machine of claim 1, wherein the cursor is displayed in a semi-transparent state.

3. The portable game machine of claim 1, wherein the object body is displayed in a semi-transparent state.

4. The portable game machine of claim 1, further comprising display form change means, for displaying one or both of said cursor and said object body in a semi-transparent state when said finger contact detecting means detects said second contact between said finger and said screen.

5. A portable game machine with a display which also serves as a touch panel input portion, comprising:

object selection means, for selecting and determining an object that is displayed on said display when a finger of a player contacts a screen of said display and displaying a selection mark showing a selection state on said object that was selected and determined;

finger contact detecting means, for detecting a second contact when the finger of said player contacts said screen of said display again after said object is selected and determined through said object selection means, and judging that a movement of said selected object is instructed;

finger position computing means, for repeatedly computing a coordinate position of said finger on said screen, during said second contact, at constant intervals;

relative position computing means, for computing a relative positional relation between said computed coordinate position of said finger and said object coordinate position of the selected object;

display form change means, for displaying said selected object in a semi-transparent state when said finger contact detecting means detects said second contact between said finger and said screen in order to easily recognize said selected object on said field;

object display position computing means, for computing and determining the object coordinate position of said selected object to be displayed according to a change in said computed coordinate position of said finger so as to always maintain said relative positional relation to the computed coordinate position of said finger; and object display means, for displaying said selected object at said coordinate position on said display computed and determined, keeping said semi-transparent state;

whereby said selected object is displayed in said semi-transparent state such that said selected object is moved in parallel to a movement locus on said screen of said finger during said second contact and the movement of said selected object can be instructed by said player while contacting the screen at a position different from said object coordinate position.

* * * * *